United States Patent

O'Daniel

[15] 3,697,994
[45] Oct. 10, 1972

[54] AUTOMATIC BEAM STEERING TECHNIQUE FOR CYLINDRICAL-ARRAY RADAR ANTENNAS

[72] Inventor: Stephen A. O'Daniel, San Diego, Calif.

[73] Assignee: The United States of America as represented by the Secretary of the Navy

[22] Filed: July 19, 1971

[21] Appl. No.: 163,850

[52] U.S. Cl. ............343/16 R, 343/100 SA, 343/854
[51] Int. Cl. ..............................................H01q 3/26
[58] Field of Search...................343/16, 100 SA, 854

[56] References Cited

UNITED STATES PATENTS 3,646,558   2/1972   Campanella................343/854

Primary Examiner—Stephen C. Bentley
Attorney—R. S. Sciascia et al.

[57] ABSTRACT

A digital computer system and technique for automatically steering the pencil beam of a 3-D cylindrical array radar antenna. The beam is steered in both elevation and azimuth by selectively energizing binary phase shifters associated with each radiating element of the array. A digital computer is used to store phase values corresponding to a selectively predetermined number of beam positions and functions in response to beam control information from the associated radar to output appropriate phase values to the radiating elements whereby agile steering of the array beam and/or random beam positioning can be obtained.

3 Claims, 3 Drawing Figures

INVENTOR.
STEPHEN A. O'DANIEL

AUTOMATIC BEAM STEERING TECHNIQUE FOR CYLINDRICAL-ARRAY RADAR ANTENNAS

BACKGROUND OF THE INVENTION

Limited space availability on ships and aircraft coupled with increasing antenna requirements for radar, communications, etc., have resulted in increased use of multi-function antennas. Effective utilization of these types of antennas obviously requires the capability to rapidly position (steer) the antenna beam to various selectively predetermined points in space. Shipboard radar system objectives for satisfying military needs include broad-spectrum signals, low-sidelobe antennas, and bearing agility. Past experience has shown that the circular-array type of antenna is effective in meeting the above objectives, and thus the use of a linear array as an element of a cylindrical array has been a natural outcome of wide-spectrum ring-array development. The present invention provides a digital technique for automatically steering the beam of a cylindrical array based on the elevation- and azimuth-scanning properties of such a configuration.

SUMMARY OF THE INVENTION

A digital technique for automatically steering the pencil beam of a cylindrical-array antenna is disclosed. The beam is steered by selectively energizing binary phase shifters located behind each radiating element and operationally associated therewith. Each phase shifter can be set in a particular setting whereby the direction of maximum response or beam position can be placed anywhere within a selectively predetermined area, and in general, each beam that is formed requires a different setting of all of the phase shifters. Consequently phase values corresponding to a selectively predetermined number of beam positions are stored in a conventional digital computer which is responsive to beam control information from the associated radar system to output beam control commands automatically. Due to the inherent beam switching capability of the resulting electronically scanned antenna, many scan patterns are possible under the control of the computer.

OBJECTS OF THE INVENTION

It is the primary object of the present invention to provide a digital, beam steering technique for a cylindrical-array radar antenna, which technique requires a minimum amount of computer data storage.

Other objects, advantages and novel features of the invention will become apparent from the following detailed description of the invention when considered in conjunction with the accompanying drawings.

DESCRIPTION OF THE PREFERRED EMBODIMENT

Figure 1:
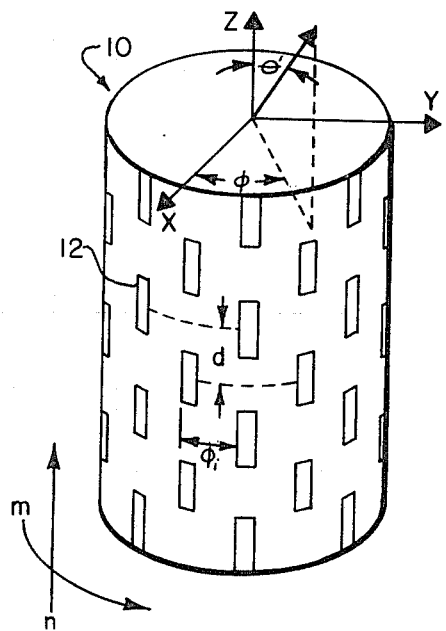
FIG. 1 is a simplified isometric view of an exemplary cylindrical-array radar antenna.

An exemplary cylindrical-array radar antenna 10 having a plurality of radiating elements 12 is shown in an isometric view in FIG. 1. The antenna 10 could operate, for example, over a frequency range of 2.9 to 3.5 Ghz and can be steered by phase control in both elevation and azimuth. In normal operation of the cylindrical array, phase steering is used in elevation only, and azimuth scanning is accomplished by commutation of the excitation distribution. However, in the system of FIG. 2 only a 60° arc of the cylinder will be operationally described; hence, azimuth scanning can be accomplished by phasing, as in the planar array, with commutation of the amplitude distribution not being required.

The cylindrical-array antenna 10 essentially comprises a stack of identical ring-arrays and can comprise, for example, 1344 active radiating elements 12 which can be disposed in 42 columns of 32 elements each. These columns lie along the generators of a cylindrical surface and occupy a 60° sector. Alternate columns can have a vertical displacement of one-half of the vertical element spacing. This configuration is preferred because of its superior scanning properties.

In accordance with the present inventive concept, each element has a digital phase shifter circuit 50 associated therewith. The phasor circuit 50 (FIG. 3) is operationally connected at the rear of its corresponding element and essentially comprises a four-bit binary adder 52, a phasor driver circuit 54 and a three-bit phasor (i.e., three-bit phase shifter) 56. A test circuit 58 is also provided for a reason to be described hereinafter.

In the preferred embodiment each phasor 56 has three additive phase units of 180°, 90° and 45°, and the state of each phase shifter is represented by an integer between zero and seven, whereby the phase shift settings can be represented in 45° units. The three bits of this number in binary form correspond directly to the 180°, 90° and 45° units of the phase shifter. It can be appreciated that digital control techniques are directly applicable in this method of individual element phase control, and hence, can also be used in antenna beam steering as will be disclosed hereinafter.

As is well-known, energy incident upon the antenna 10 from a particular direction will excite each receiving element with a different phase. The phase shifter 56 associated with each element 12 functions to equalize the output phases of all of the elements so that summation of the phases will produce the maximum signal amplitude. By correctly setting the phase shifters, the direction of maximum response (that is, the beam position) can be selectively placed (steered) anywhere within a selected area.

Since each beam that is formed requires a different setting of all 1344 phase shifters, it is apparent that even modest beam agility requires some form of automatic control. The beam steering circuitry shown in FIG. 2 can operate to automatically steer a beam in any one of, for example, 900 beam positions within an azimuth sector of ± 25° and with elevation limits of +30° and −15° in a manner to be described hereinafter.

As shown in FIG. 1, the indices m and n represent the column and row locations for the position on the antenna of each of the elements. As shown, the elements are located at positions for which the sum of m and n is even although the sum could be selected to be odd. The required phase shifter setting for an element located at $(m, n)$ to form a beam having the coordinates $(\theta', \phi)$ can be represented by the following equation:

$P_{mn} = 8nd \cos \theta' - 8A \sin \theta' \cos(\phi_o + m\phi_i - \phi)$

The expression can be reduced to modulus eight and rounded to the nearest integer. The symbols in the equation represent the following quantities:

$P$ = the digital phase shifter setting for an element at $(m, n)$ $A$ = the radius of the cylindrical array (in wavelengths)

$d$ = the spacing between rows of elements (in wavelengths)

$\phi_o$ = the azimuth location of the reference column ($m$ = o column)

$\phi_i$ = the angular spacing between the vertical columns of elements

Figure 2:
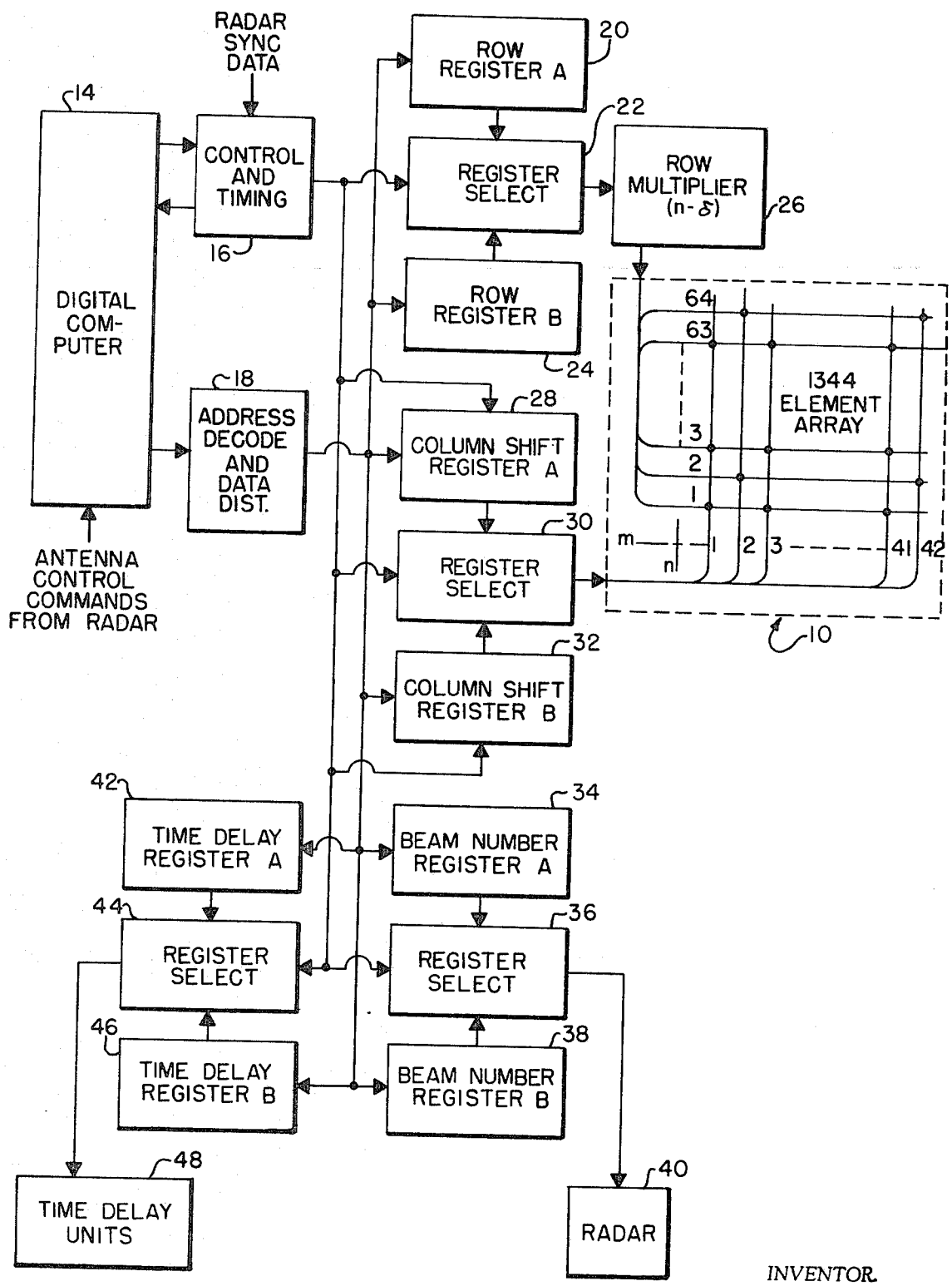
FIG. 2 is a simplified block diagram of a digital computer system which can be used to advantage in accordance with the inventive concept disclosed herein to provide automatic, electronic steering of cylindrical-array radar antenna pencil beams.

For the 1344 element antenna array 10 shown in FIG. 1 and FIG. 2, the indices m and n can assume 42 and 64 consecutive integer values, respectively. As previously stated, the elements are at lattice locations for which the sum of $m$ and $n$ is even although the indices can assume positive or negative values. The range for $n$ is arbitrary since the addition of a constant value to all $n$ values simply changes all phase values by the same amount. The range of $m$ values, however, must be consistent with the choice of $\phi_o$. Obviously, the above equation must be solved for 1344 phase values for each possible antenna beam position required.

Once the antenna phasors 50 have been set to form a selectively predetermined beam, the radar 40 can transmit radar pulses. The phasors must remain set for this beam position until the transmitted energy returns from the maximum range of the radar if continuous range coverage is desired. The relationship between the "waiting" time and maximum range is defined by the following equation:

$$t_w \text{ (microseconds)} = \frac{20}{3} \times R \text{ max. (kilometers)}$$

For example, a 50 kilometer maximum range (about 27 nautical miles) corresponds to 333 microseconds of "waiting" time. However, less time is available for the digital computer 14 of FIG. 2 to transfer phase values and other data words to the radar antenna for the next beam position. Furthermore, the computer must also communicate with radar control and perform other operations during this time. For shorter ranges of operation, considerably less time may be available to transfer control information to the antenna. However, due to the inherent beam switching capability of the electronic scan technique disclosed herein (whereby consecutive beams may be formed in any direction within antenna scan limits), many scan patterns are possible and may be implemented under computer control.

Figure 3:
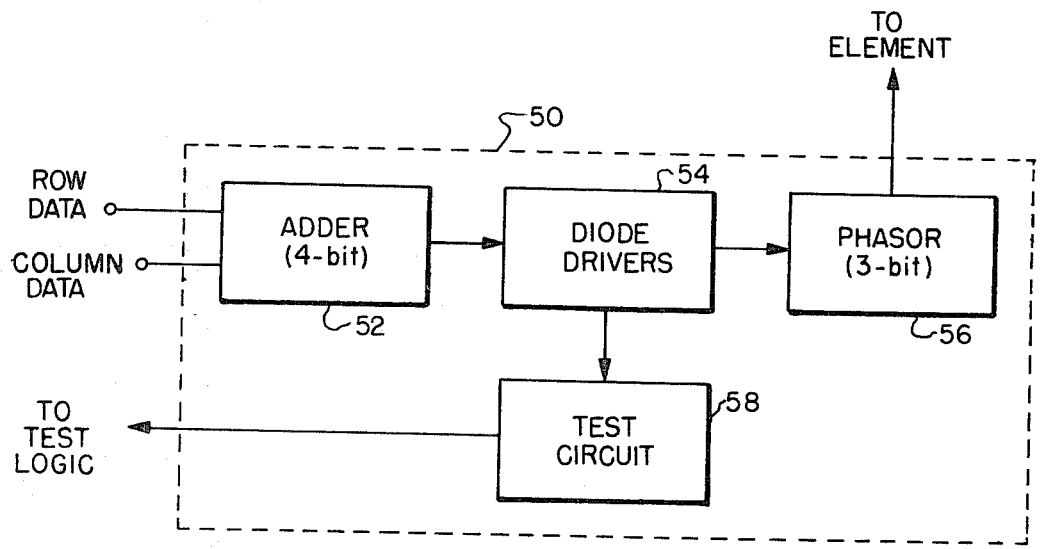
FIG. 3 is an electrical schematic of a binary phasor of the type operationally associated with each radiating element of the multi-element array of FIG. 1 and FIG. 2.

For example, the digital computer system shown in FIG. 2 can be used to rapidly and effectively provide selectively predetermined phase values to the elements of the antenna array 10 without the necessity of memory devices at the individual elements, and with a minimum amount of storage capacity required in the computer 14. The above is essentially accomplished by providing each element of the array with a phasor circuit 50 as shown in FIG. 3 which sums a four-bit row binary number and a four-bit column binary number at each element.

Although only three bits of the four-bit adder 52 are used to control the three-bit phase shifter 56, four-bit numbers are summed at each element to avoid excessive rounding errors. In the array 10 of FIG. 2, each dot represents the location of an element and the point at which the intersecting row and column four-bit words are summed to provide the three-bit phase value for each element. The rows of the antenna array are shown running horizontally and are numbered one through 64 while the columns are shown running vertically and are numbered one through 42.

With reference to the above equation, it can be seen that the phase setting for a given element $(m, n)$ consists of the sum of two terms, and that for a given beam $(\theta', \phi)$, the first term in the equation is linear. Consequently, the value of this term depends only upon the row $(n)$ in question (n times a constant).

Thus all required row data can be produced from a single number, $8d \cos \theta'$. In operation, the row multiplier 26 of FIG. 2 accepts a 10-bit number output from one of the two row registers 20 and 24 and provides a four-bit number to each of the 64 rows. The register select 22 selects one of the two row registers and transfers the contents of the selected row register to the antenna 10 (or to the radar 40) in response to the commands from the computer control logic 16.

The second term of the above equation includes the cosine of a function of $m$ for a given beam $(\theta', \phi)$. This column value cannot be generated as readily as the row value since it is relatively complex because it includes a correction factor to compensate for the curvature of the cylindrical surface.

Consequently, the values to be fed to the columns are precomputed and stored in the computer 14. The values are transferred to one of the two column shift registers 32 and 36 which provides a four-bit number to each of the 42 columns in response to a command from the column register select 30.

It should be appreciated that two sets of registers are provided for both the row and column channels to avoid possible loss of antenna beam control during the time required to load the registers for a different beam position. By making the registers individually addressable for loading, greater versatility in antenna control is possible and the complexity of the control and timing logic 16 is reduced.

Obviously the antenna 10 cannot be used during the time required for data to be propagated from the selected register set to the element phasor circuits. However, the time delay through the row multiplier circuit 26, for example, is only in the order of 0.5 microseconds.

In operation, the radar 40 provides antenna beam control information to the computer 14 and synchronizing information to the control and timing unit 16 where it is employed to prevent antenna beam switching during radar transmission periods. The current beam number is constantly provided to the radar 40 from the selected beam register 34 or 38.

As the above equation reveals, an infinite number of beam positions are possible. Consequently, to have all beam positions available would require the on-line computations of phase values for each possible beam since the storage of phase values for every beam position is clearly not possible. Since even a very fast computer would require several milliseconds to compute the phase settings for a new beam, this method would not be practical for high-speed antenna scanning.

The present method as embodied in the system of FIG. 2 however, is practical and effective and essentially involves storing phase values for a selectively predetermined number of beam positions in the computer 14. As stated previously the system of FIG. 2 can function, for example, to provide 900 or less beam positions which will provide sufficient accuracy and coverage for most requirements. The 900 beam positions can be provided by thirty possible azimuth positions and 30 possible elevation positions which makes possible about a 45° scan in each plane.

The value of the equation will remain constant if m is increased by one at the same time that $\phi$ is increased by $\phi_i$. Thus, if every phase setting on the antenna elements is moved to the left or to the right by one column, the main beam is moved in azimuth by $\phi_i$.

This fact is significant since it is directly related to the amount of storage space required within the computer since by storing phase value tables over an extended range of $m$ values, it is possible for one such table to provide correct phases for all azimuth beams at the same elevation angle. Therefore the number of tables in storage will be exactly equal to the total number of beams. The length of each table is directly related to the number of required azimuth beam positions.

For sequential azimuth scanning, the computer transfers four bits of data into the column shift register 28 or 32 that is connected to the antenna 10. This process of transferring four bits of data continues until the beam reaches its azimuth limit. At this time the alternate set of registers, which have been loaded with the next elevation position data, are connected to the antenna. This procedure provides a full raster scan. A limited raster scan over a specified area can also be achieved by similar procedure.

It should be appreciated that all other operating modes require the transfer of a complete new set of data for each new beam and the same data transfer time as for random beam positioning.

With respect to data storage requirements, it will be recalled that 42 four-bit words are required at the input of the column registers and one 10-bit word is required at the input of the row registers to set all the phasors for a selectively predetermined beam. Also, additional beams in azimuth for a particular elevation position can be generated for each new four-bit value that is shifted into the column shift register 28 or 32. This means that for 30 azimuth beams, the storage space required is 42 four-bit words for the first beam plus 29 four-bit words for the next 29 beams for a total of 71 values. Also 12 three-bit time delay words must be stored in the time delay unit 48 for each possible beam position for a total of 360 values for 30 beams.

If, for example, a 16-bit computer word is used, this equates to eighty-seven 16-bit words per elevation position. For 30 elevation positions, the minimum storage requirement for beam data is 2,610 computer words, assuming maximum packing of data.

The following expression gives the minimum number of 16-bit words required for any selectively predetermined number of elevation and azimuth beam positions:

$$N = n_{EL}[(10 n_{AZ}+45)/4$$

where
$n_{EL}$ = number of elevation beams
$n_{AZ}$ = number of azimuth beams
$N$ = number of 16-bit words If a 16-bit data word is transferred by the address decode and data distribution unit 18 for each beam position, the word is divided among the four separate sets of registers of FIG. 2. Therefore, in the output sequence, the unit 18 will address a selected register which will transfer its output through the corresponding register select circuit until the 20 words are transferred.

Once the computer program has interpreted the command from the radar and found a block of data to be transferred to the antenna it must make several more memory references to output the phase data and control words. By way of illustration, the instruction execution time (for an exemplary computer) to transfer 20 data words, address the selected registers, and output one required control command, is in the order of 100 usec.

The N-bit phasors 56 (diode phase shifters) of FIG. 3 and which are operatively connected to each of the elements can be driven, for example, by a phase driver 54 of the type disclosed in my copending patent application Ser. No. 83,556, entitled "Complimentary Driver for Diode Digital Phase Shifters," and filed on Oct. 23, 1970 by Stephen A. O'Daniel et al. The phasor 56 can comprise a PIN diode digital phase shifter having 180°, 90°, and 45° phase bits which can be added in all possible combinations to achieve phase stepping. Thick-film microcircuit techniques can be utilized advantageously to improve the reliability and reduce the cost of these components.

The circuit of FIG. 3 includes a test circuit for testing for defective or inoperative control components. Random failure of elements of phased arrays is characterized by a gradual degradation of performance as more and more radiating elements cease to operate effectively or fail completely. The test circuit 58 provides a capability for replacing or repairing these components as they fail. Alternatively, periodic inspections and manual tests could be performed when antenna degradation manifests itself. In order to exhaustively test the antenna it can be appreciated that it would be necessary to sample radiated energy at each element and to measure phase and power. Obviously this method would be quite expensive and would introduce additional RF losses in the system due to the additional components required.

The test circuit 58 essentially comprises a "GO-NO-GO" integrated circuit which functions on the output from each phasor, that is, each element of the array has a test circuit which is designed to detect faulty control information up to and including the pin diodes in the phase shifter.

Thus it can be seen that a novel technique for steering beams from cylindrical array antennas has been disclosed. The technique employs a small general purpose computer which is used to selectively energize digital phase shifters located behind the radiating elements of the array. The technique requires significantly less storage capacity in the computer than would be required if flip-flops were used to form shift registers along rows or columns, and, in addition, less set-up time to transfer data for a given beam is required.

Obviously many modifications and variations of the present invention are possible in the light of the above teachings. It is therefore to be understood that within the scope of the appended claims the invention may be practiced otherwise than as specifically described.

What is claimed is:

1. An automatic beam steering control system for a cylindrical-array antenna of a radar system comprising:
   a cylindrical-array radar antenna having a plurality of active elements arranged and disposed in a selectively predetermined number of rows and columns on the surface thereof;
   binary phasor means connected to each of said elements on the back side thereof;
   digital computer means connected at the input thereof to said radar system for receiving beam control information from said radar system;
   said digital computer means including means for storing phase value tables for a selectively predetermined number of beam positions, the number of tables required to be stored being equal to the total number of elevation beam positions only, and the length of each of said tables being equal to the number of required azimuth beam positions;
   a plurality of row and column shift register means connected to the output of said digital computer means and being responsive to control commands from computer control logic means to transfer selectively predetermined ones of said stored phase values to said binary phasor means;
   said binary phasor means including serially connected N-bit binary adder means and N-bit phase shifter means responsive to the phase values transferred thereto to thereby set all of said binary phasors to steer a beam in a selectively predetermined direction.

2. The system of claim 1 further including row multiplier means connected to said row shift register means.

3. The system of claim 1 further including beam number shift register means connected to the output of said digital computer means for transferring current beam number data to said radar system and time delay register means for transferring time delay data to time delay means.

* * * * *